US012755262B2

(12) United States Patent
Arora et al.

(10) Patent No.: US 12,755,262 B2
(45) Date of Patent: Oct. 6, 2026

(54) SYSTEM, METHOD, AND COMPUTER PROGRAM PRODUCT FOR TRANSACTION DATA COMPRESSION

(71) Applicant: Visa International Service Association, San Francisco, CA (US)

(72) Inventors: Sahil Arora, Haryana (IN); Palakh Shangle, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 71 days.

(21) Appl. No.: 18/896,107

(22) Filed: Sep. 25, 2024

(65) Prior Publication Data

US 2026/0087473 A1 Mar. 26, 2026

(51) Int. Cl.
*G06Q 20/20* (2012.01)

(52) U.S. Cl.
CPC .................................. *G06Q 20/202* (2013.01)

(58) Field of Classification Search
CPC .................................................... G06Q 20/202
See application file for complete search history.

(56) References Cited

U.S. PATENT DOCUMENTS

| | | | | |
|---|---|---|---|---|
| 9,330,150 | B1 * | 5/2016 | Sherry | H03M 7/30 |
| 10,540,384 | B2 | 1/2020 | Maybee et al. | |
| 2007/0005509 | A1 * | 1/2007 | Spiller | G06Q 99/00 705/65 |
| 2008/0071818 | A1 * | 3/2008 | Apanowicz | H03M 7/30 |
| 2009/0106210 | A1 * | 4/2009 | Slezak | G06F 16/285 707/E17.046 |
| 2017/0372355 | A1 * | 12/2017 | Pandey | G06Q 10/107 |
| 2018/0143770 | A1 * | 5/2018 | Arelakis | G06F 3/0608 |
| 2020/0097571 | A1 * | 3/2020 | Mathur | G06F 16/2282 |
| 2022/0004649 | A1 * | 1/2022 | Smith | H04L 63/08 |

(Continued)

FOREIGN PATENT DOCUMENTS

| | | | |
|---|---|---|---|
| CN | 113242041 | A | 8/2021 |

OTHER PUBLICATIONS

"Huffman coding". Retrieved from <https://en.wikipedia.org/w/index.php?title=Huffman_coding&oldid=1175907130>. Revision date Sep. 2023. (Year: 2023).*

*Primary Examiner* — Nathan A Mitchell
(74) *Attorney, Agent, or Firm* — The Webb Law Firm

(57) ABSTRACT

Systems, methods, and computer program products are provided for transaction data compression. An example system includes at least one processor configured to: segment transaction data into numerical data, sensitive data, string data, and temporal data; compress, using at least one first compression algorithm, the numerical data into compressed numerical data; compress, using at least one second compression algorithm, the sensitive data into compressed sensitive data; compress, using at least one third compression algorithm, the string data into compressed string data; compress, using at least one fourth compression, the temporal data into compressed temporal data; and at least one of: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

20 Claims, 5 Drawing Sheets

(56) References Cited

U.S. PATENT DOCUMENTS

| | | | | |
|---|---|---|---|---|
| 2024/0111439 | A1* | 4/2024 | Pavlichin | G06F 3/0661 |
| 2025/0021948 | A1* | 1/2025 | Ketharaju | G06Q 20/3224 |
| 2025/0335918 | A1* | 10/2025 | Cartia | G06Q 20/4016 |

* cited by examiner

100

SYSTEM, METHOD, AND COMPUTER PROGRAM PRODUCT FOR TRANSACTION DATA COMPRESSION

BACKGROUND

1. Technical Field

This disclosure relates generally to data compression and, in non-limiting embodiments or aspects, to systems, methods, and computer program products for transaction data compression in real-time transaction processing.

2. Technical Considerations

Transaction processing systems may process billions of transactions each day. The speed at which the data for these transactions is transmitted, stored, and/or processed matters because any delay, even that of milliseconds, can lead to bottlenecks and/or backlogs that affect customer experience and potentially lead to financial losses. Contributing factors to latency include a time taken to transfer and store large volumes of transaction data across global data centers and transmit and process transactions between point-of-sale (POS) devices and transaction processing servers. Existing data compression methods may not be efficient enough and/or may not be designed for the specific numerical and limited-string nature of transaction data, leading to increased data transfer times and storage latency.

SUMMARY

Accordingly, provided are improved systems, methods, and computer program products for transaction data compression.

According to non-limiting embodiments or aspects, provided is a system, including: at least one processor configured to: obtain transaction data associated with a transaction; segment the transaction data into numerical data, sensitive data, string data, and temporal data; compress, using at least one first compression algorithm, the numerical data into compressed numerical data; compress, using at least one second compression algorithm different than the at least one first compression algorithm, the sensitive data into compressed sensitive data; compress, using at least one third compression algorithm different than the at least one first compression algorithm and the at least one second compression algorithm, the string data into compressed string data; compress, using at least one fourth compression algorithm different than the at least one first compression algorithm, the at least one second compression algorithm, and the at least one third compression algorithm, the temporal data into compressed temporal data; and at least one of the following: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

In some non-limiting embodiments or aspects, the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

In some non-limiting embodiments or aspects, the at least one processor is configured to segment the transaction data into the numerical data, the sensitive data, the string data, and the temporal data by: further segmenting the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein the at least one processor is configured to compress, using the at least one first compression algorithm, the numerical data into compressed numerical data by: converting the long numerical data from a first numeral base to a second numeral base having a higher base than the first numeral base; and mapping the short numerical data from a first numeric range to a second numeric range having a smaller set of numbers than the first numeric range.

In some non-limiting embodiments or aspects, the at least one processor is configured to compress, using the at least one third compression algorithm different than the at least one first compression algorithm and the at least one second compression algorithm, the string data into compressed string data by: identifying, in the string data, a merchant identifier associated with a merchant associated with the transaction; and replacing, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

In some non-limiting embodiments or aspects, the at least one processor is configured to compress in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

In some non-limiting embodiments or aspects, the system further includes: a point-of-sale (POS) device including the at least one processor, wherein the at least one processor of the POS device is configured to transmit the compressed numerical data, the compressed sensitive data, the compressed string data, and the compressed temporal data to the transaction processing server; and the transaction processing server including at least one processor configured to: receive the compressed numerical data, the compressed sensitive data, the compressed string data, and the compressed temporal data; decompress, using at least one first decompression algorithm corresponding to the at least one first compression algorithm, the compressed numerical data into the numerical data; decompress, using at least one second decompression algorithm corresponding to the at least one second compression algorithm, the compressed sensitive data into the sensitive data; decompress, using at least one third decompression algorithm corresponding to the least one third compression algorithm, the compressed string data into the string data; decompress, using at least fourth decompression algorithm corresponding to the at least one fourth compression algorithm, the compressed temporal data into the temporal data; and authorize or deny, based on at least one of the following: the numerical data, the sensitive data, the string data, the temporal data, or any combination thereof, the transaction.

In some non-limiting embodiments or aspects, the at least one processor is further configured to: encrypt the sensitive data before the sensitive data is compressed using the at least one second compression algorithm.

According to non-limiting embodiments or aspects, provided is a method, including: obtaining, with at least one processor, transaction data associated with a transaction; segmenting, with the at least one processor, the transaction data into numerical data, sensitive data, string data, and temporal data; compressing, with the at least one processor, using at least one first compression algorithm, the numerical data into compressed numerical data; compressing, with the at least one processor, using at least one second compression algorithm different than the at least one first compression algorithm, the sensitive data into compressed sensitive data; compressing, with the at least one processor, using at least one third compression algorithm different than the at least one first compression algorithm and the at least one second compression algorithm, the string data into compressed string data; compressing, with the at least one processor, using at least one fourth compression algorithm different than the at least one first compression algorithm, the at least one second compression algorithm, and the at least one third compression algorithm, the temporal data into compressed temporal data; and at least one of the following: (i) storing, with the at least one processor, in a data store, the compressed numerical data, the compressed sensitive data, the compressed string data, and the compressed temporal data; and (ii) transmitting, with the at least one processor, the compressed numerical data, the compressed sensitive data, the compressed string data, and the compressed temporal data to a transaction processing server, or any combination thereof.

In some non-limiting embodiments or aspects, the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

In some non-limiting embodiments or aspects, segmenting, with the at least one processor, the transaction data into the numerical data, the sensitive data, the string data, and the temporal data includes: further segmenting, with the at least one processor, the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein compressing, with the at least one processor, using the at least one first compression algorithm, the numerical data into compressed numerical data includes: converting, with the at least one processor, the long numerical data from a first numeral base to a second numeral base having a higher base than the first numeral base; and mapping, with the at least one processor, the short numerical data from a first numeric range to a second numeric range having a smaller set of numbers than the first numeric range.

In some non-limiting embodiments or aspects, compressing, with the at least one processor, using the at least one third compression algorithm different than the at least one first compression algorithm and the at least one second compression algorithm, the string data into compressed string data includes: identifying, with the at least one processor, in the string data, a merchant identifier associated with a merchant associated with the transaction; and replacing, with the at least one processor, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

In some non-limiting embodiments or aspects, the at least one processor compresses in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

In some non-limiting embodiments or aspects, the method further includes: receiving, with the at least one processor, the compressed numerical data, the compressed sensitive data, the compressed string data, and the compressed temporal data; decompressing, with the at least one processor, using at least one first decompression algorithm corresponding to the at least one first compression algorithm, the compressed numerical data into the numerical data; decompressing, with the at least one processor, using at least one second decompression algorithm corresponding to the at least one second compression algorithm, the compressed sensitive data into the sensitive data; decompressing, with the at least one processor, using at least one third decompression algorithm corresponding to the least one third compression algorithm, the compressed string data into the string data; decompressing, with the at least one processor, using at least fourth decompression algorithm corresponding to the at least one fourth compression algorithm, the compressed temporal data into the temporal data; and authorizing or denying, with the at least one processor, based on at least one of the following: the numerical data, the sensitive data, the string data, the temporal data, or any combination thereof, the transaction.

In some non-limiting embodiments or aspects, the method further includes: encrypting, with the at least one processor, the sensitive data before the sensitive data is compressed using the at least one second compression algorithm.

According to non-limiting embodiments or aspects, provided is a computer program product including at least one non-transitory computer-readable medium including program instructions that, when executed by at least one processor, cause the at least one processor to: obtain transaction data associated with a transaction; segment the transaction data into numerical data, sensitive data, string data, and temporal data; compress, using at least one first compression algorithm, the numerical data into compressed numerical data; compress, using at least one second compression algorithm different than the at least one first compression algorithm, the sensitive data into compressed sensitive data; compress, using at least one third compression algorithm different than the at least one first compression algorithm and the at least one second compression algorithm, the string data into compressed string data; compress, using at least one fourth compression algorithm different than the at least one first compression algorithm, the at least one second compression algorithm, and the at least one third compression algorithm, the temporal data into compressed temporal data; and at least one of the following: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

In some non-limiting embodiments or aspects, the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

In some non-limiting embodiments or aspects, the program instructions, when executed by the at least one processor, cause the at least one to segment the transaction data into the numerical data, the sensitive data, the string data, and the temporal data by: further segmenting the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein the at least one processor is configured to compress, using the at least one first compression algorithm, the numerical data into compressed numerical data by: converting the long numerical data from a first numeral base to a second numeral base having a higher base than the first numeral base; and mapping the short numerical data from a first numeric range to a second numeric range having a smaller set of numbers than the first numeric range.

In some non-limiting embodiments or aspects, the program instructions, when executed by the at least one processor, cause the at least one to compress, using the at least one third compression algorithm different than the at least one first compression algorithm and the at least one second compression algorithm, the string data into compressed string data by: identifying, in the string data, a merchant identifier associated with a merchant associated with the transaction; and replacing, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

In some non-limiting embodiments or aspects, the program instructions, when executed by the at least one processor, cause the at least one to compress in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

In some non-limiting embodiments or aspects, the program instructions, when executed by the at least one processor, further cause the at least one to: receive the compressed numerical data, the compressed sensitive data, the compressed string data, and the compressed temporal data; decompress, using at least one first decompression algorithm corresponding to the at least one first compression algorithm, the compressed numerical data into the numerical data; decompress, using at least one second decompression algorithm corresponding to the at least one second compression algorithm, the compressed sensitive data into the sensitive data; decompress, using at least one third decompression algorithm corresponding to the least one third compression algorithm, the compressed string data into the string data; decompress, using at least fourth decompression algorithm corresponding to the at least one fourth compression algorithm, the compressed temporal data into the temporal data; and authorize or deny, based on at least one of the following: the numerical data, the sensitive data, the string data, the temporal data, or any combination thereof, the transaction.

Further non-limiting embodiments or aspects are set forth in the following numbered clauses:

Clause 1: A system, comprising: at least one processor configured to: obtain transaction data associated with a transaction; segment the transaction data into numerical data, sensitive data, string data, and temporal data; compress, using at least one first compression algorithm, the numerical data into compressed numerical data; compress, using at least one second compression algorithm different than the at least one first compression algorithm, the sensitive data into compressed sensitive data; compress, using at least one third compression algorithm different than the at least one first compression algorithm and the at least one second compression algorithm, the string data into compressed string data; compress, using at least one fourth compression algorithm different than the at least one first compression algorithm, the at least one second compression algorithm, and the at least one third compression algorithm, the temporal data into compressed temporal data; and at least one of the following: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

Clause 2: The system of clause 1, wherein the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

Clause 3: The system of clause 1 or 2, wherein the at least one processor is configured to segment the transaction data into the numerical data, the sensitive data, the string data, and the temporal data by: further segmenting the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein the at least one processor is configured to compress, using the at least one first compression algorithm, the numerical data into compressed numerical data by: converting the long numerical data from a first numeral base to a second numeral base having a higher base than the first numeral base; and mapping the short numerical data from a first numeric range to a second numeric range having a smaller set of numbers than the first numeric range.

Clause 4: The system of any of clauses 1-3, wherein the at least one processor is configured to compress, using the at least one third compression algorithm different than the at least one first compression algorithm and the at least one second compression algorithm, the string data into compressed string data by: identifying, in the string data, a merchant identifier associated with a merchant associated with the transaction; and replacing, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

Clause 5: The system of any of clauses 1-4, wherein the at least one processor is configured to compress in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

Clause 6: The system of any of clauses 1-5, further comprising: a point-of-sale (POS) device including the at least one processor, wherein the at least one processor of the POS device is configured to transmit the compressed numerical data, the compressed sensitive data, the compressed string data, and the compressed temporal data to the transaction processing server; and the transaction processing server including at least one processor configured to: receive the compressed numerical data, the compressed sensitive data, the compressed string data, and the compressed temporal data; decompress, using at least one first decompression algorithm corresponding to the at least one first compression algorithm, the compressed numerical data into the numerical data; decompress, using at least one second decompression algorithm corresponding to the at least one second compression algorithm, the compressed sensitive data into the sensitive data; decompress, using at least one third decompression algorithm corresponding to the least one third compression algorithm, the compressed string data into the string data; decompress, using at least fourth decompression algorithm corresponding to the at least one fourth compression algorithm, the compressed temporal data into the temporal data; and authorize or deny, based on at least one of the following: the numerical data, the sensitive data, the string data, the temporal data, or any combination thereof, the transaction.

Clause 7: The system of any of clauses 1-6, wherein the at least one processor is further configured to: encrypt the sensitive data before the sensitive data is compressed using the at least one second compression algorithm.

Clause 8: A method, comprising: obtaining, with at least one processor, transaction data associated with a transaction; segmenting, with the at least one processor, the transaction data into numerical data, sensitive data, string data, and temporal data; compressing, with the at least one processor, using at least one first compression algorithm, the numerical data into compressed numerical data; compressing, with the at least one processor, using at least one second compression algorithm different than the at least one first compression algorithm, the sensitive data into compressed sensitive data; compressing, with the at least one processor, using at least one third compression algorithm different than the at least one first compression algorithm and the at least one second compression algorithm, the string data into compressed string data; compressing, with the at least one processor, using at least one fourth compression algorithm different than the at least one first compression algorithm, the at least one second compression algorithm, and the at least one third compression algorithm, the temporal data into compressed temporal data; and at least one of the following: (i) storing, with the at least one processor, in a data store, the compressed numerical data, the compressed sensitive data, the compressed string data, and the compressed temporal data; and (ii) transmitting, with the at least one processor, the compressed numerical data, the compressed sensitive data, the compressed string data, and the compressed temporal data to a transaction processing server, or any combination thereof.

Clause 9: The method of clause 8, wherein the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

Clause 10: The method of clause 8 or 9, wherein segmenting, with the at least one processor, the transaction data into the numerical data, the sensitive data, the string data, and the temporal data includes: further segmenting, with the at least one processor, the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein compressing, with the at least one processor, using the at least one first compression algorithm, the numerical data into compressed numerical data includes: converting, with the at least one processor, the long numerical data from a first numeral base to a second numeral base having a higher base than the first numeral base; and mapping, with the at least one processor, the short numerical data from a first numeric range to a second numeric range having a smaller set of numbers than the first numeric range.

Clause 11: The method of any of clauses 8-10, wherein compressing, with the at least one processor, using the at least one third compression algorithm different than the at least one first compression algorithm and the at least one second compression algorithm, the string data into compressed string data includes: identifying, with the at least one processor, in the string data, a merchant identifier associated with a merchant associated with the transaction; and replacing, with the at least one processor, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

Clause 12: The method of any of clauses 8-11, wherein the at least one processor compresses in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

Clause 13: The method of any of clauses 8-12, further comprising: receiving, with the at least one processor, the compressed numerical data, the compressed sensitive data, the compressed string data, and the compressed temporal data; decompressing, with the at least one processor, using at least one first decompression algorithm corresponding to the at least one first compression algorithm, the compressed numerical data into the numerical data; decompressing, with the at least one processor, using at least one second decompression algorithm corresponding to the at least one second compression algorithm, the compressed sensitive data into the sensitive data; decompressing, with the at least one processor, using at least one third decompression algorithm corresponding to the least one third compression algorithm, the compressed string data into the string data; decompressing, with the at least one processor, using at least fourth decompression algorithm corresponding to the at least one fourth compression algorithm, the compressed temporal data into the temporal data; and authorizing or denying, with the at least one processor, based on at least one of the following: the numerical data, the sensitive data, the string data, the temporal data, or any combination thereof, the transaction.

Clause 14: The method of any of clauses 8-13, further comprising: encrypting, with the at least one processor, the sensitive data before the sensitive data is compressed using the at least one second compression algorithm.

Clause 15: A computer program product comprising at least one non-transitory computer-readable medium including program instructions that, when executed by at least one processor, cause the at least one processor to: obtain transaction data associated with a transaction; segment the transaction data into numerical data, sensitive data, string data, and temporal data; compress, using at least one first compression algorithm, the numerical data into compressed numerical data; compress, using at least one second compression algorithm different than the at least one first compression algorithm, the sensitive data into compressed sensitive data; compress, using at least one third compression algorithm different than the at least one first compression algorithm and the at least one second compression algorithm, the string data into compressed string data; compress, using at least one fourth compression algorithm different than the at least one first compression algorithm, the at least one second compression algorithm, and the at least one third compression algorithm, the temporal data into compressed temporal data; and at least one of the following: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

Clause 16: The computer program product of clause 15, wherein the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

Clause 17: The computer program product of clause 15 or 16, wherein the program instructions, when executed by the at least one processor, cause the at least one to segment the transaction data into the numerical data, the sensitive data, the string data, and the temporal data by: further segmenting the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein the at least one processor is configured to compress, using the at least one first compression algorithm, the numerical data into compressed numerical data by: converting the long numerical data from a first numeral base to a second numeral base having a higher base than the first numeral base; and mapping the short numerical data from a first numeric range to a second numeric range having a smaller set of numbers than the first numeric range.

Clause 18: The computer program product of any of clauses 15-17, wherein the program instructions, when executed by the at least one processor, cause the at least one to compress, using the at least one third compression algorithm different than the at least one first compression algorithm and the at least one second compression algorithm, the string data into compressed string data by: identifying, in the string data, a merchant identifier associated with a merchant associated with the transaction; and replacing, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

Clause 19: The computer program product of any of clauses 15-18, wherein the program instructions, when executed by the at least one processor, cause the at least one to compress in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

Clause 20: The computer program product of any of clauses 15-19, wherein the program instructions, when executed by the at least one processor, further cause the at least one to: receive the compressed numerical data, the compressed sensitive data, the compressed string data, and the compressed temporal data; decompress, using at least one first decompression algorithm corresponding to the at least one first compression algorithm, the compressed numerical data into the numerical data; decompress, using at least one second decompression algorithm corresponding to the at least one second compression algorithm, the compressed sensitive data into the sensitive data; decompress, using at least one third decompression algorithm corresponding to the least one third compression algorithm, the compressed string data into the string data; decompress, using at least fourth decompression algorithm corresponding to the at least one fourth compression algorithm, the compressed temporal data into the temporal data; and authorize or deny, based on at least one of the following: the numerical data, the sensitive data, the string data, the temporal data, or any combination thereof, the transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
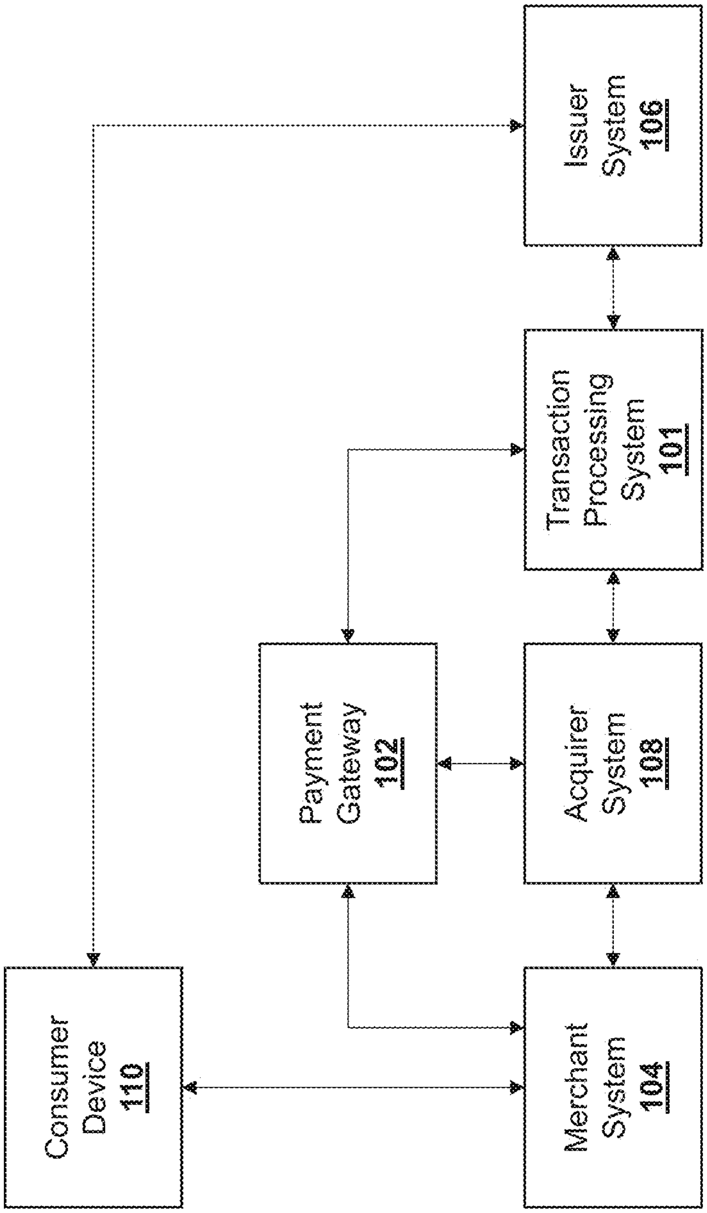
FIG. 1 is a schematic diagram of an electronic payment processing network, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects of the disclosed subject matter. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "real-time" may refer to performance of a task or tasks during another process or before another process is completed. For example, a real-time inference may be an inference that is obtained from a model before a payment transaction is authorized, completed, and/or the like.

Some non-limiting embodiments or aspects of the present disclosure provide systems, methods, and/or computer program products that obtain transaction data associated with a transaction; segment the transaction data into numerical data, sensitive data, string data, and temporal data; compress, using at least one first compression algorithm, the numerical data into compressed numerical data; compress, using at least one second compression algorithm different than the at least one first compression algorithm, the sensitive data into compressed sensitive data; compress, using at least one third compression algorithm different than the at least one first compression algorithm and the at least one second compression algorithm, the string data into compressed string data; compress, using at least one fourth compression algorithm different than the at least one first compression algorithm, the at least one second compression algorithm, and the at least one third compression algorithm, the temporal data into compressed temporal data; and at least one of the following: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

In this way, some non-limiting embodiments or aspects of the present disclosure may provide compression techniques that are specifically designed for the types of data that transaction processing systems handle, such as transaction details, customer information, and/or the like, and that significantly reduce the size and/or number of transaction data packets without losing any information needed for processing transactions (e.g., smaller or fewer data packets enables faster transmission across the network, thereby reducing an overall latency in transaction processing, which may be particularly beneficial for international transactions where data has to travel long distances, etc.). For example, some non-limiting embodiments or aspects of the present disclosure may improve the efficiency, speed, and bandwidth usage of data storage and transfer, particularly for data in transit and at rest, within transaction processing systems.

Some non-limiting embodiments or aspects of the present disclosure may further provide for prioritizing the compression of long numerics (e.g., account numbers, large IDs, etc.), short numerics (e.g., purchase amounts, etc.), and predictable strings (e.g., merchant IDs, timestamps, etc.), which may constitute a bulk of transaction data, thereby further optimizing storage and improving data transfer speeds and reducing bandwidth usage within networks. For example, some non-limiting embodiments or aspects of the present disclosure may use targeted compression techniques for numerical and string data, combined with predictive pattern analysis, to achieve superior compression speeds and efficiency, thereby reducing latency in transaction transmission and processing and enhancing the infrastructure's capacity to handle the rapidly growing volume of financial data.

Some non-limiting embodiments or aspects of the present disclosure may provide, alongside compression, corresponding decompression techniques that are designed for rapid decompression to ensure that once the data reaches its destination, the data can be quickly decompressed and processed without delay, thereby enabling real-time or near-real-time processing of transactions, ensuring that a transaction processing system's speeds remain at the forefront of the industry.

Referring now to FIG. 1, FIG. 1 shows an electronic payment processing network 100, according to some non-limiting embodiments or aspects. The payment processing network 100 may be used in conjunction with the systems and methods described herein. It will be appreciated that the particular arrangement of electronic payment processing network 100 shown is for example purposes only and that various arrangements are possible. Transaction processing system 101 (e.g., a transaction handler) is shown to be in communication with one or more issuer systems (e.g., such as issuer system 106) and one or more acquirer systems (e.g., such as acquirer system 108). Although only a single issuer system 106 and single acquirer system 108 are shown, it will be appreciated that transaction processing system 101 may be in communication with a plurality of issuer systems and/or acquirer systems. In some non-limiting embodiments or aspects, transaction processing system 101 may also operate as an issuer system, such that both transaction processing system 101 and issuer system 106 are a single system and/or controlled by a single entity.

In some non-limiting embodiments or aspects, transaction processing system 101 may communicate with merchant system 104 directly through a public or private network connection. Additionally, or alternatively, transaction processing system 101 may communicate with merchant system 104 through payment gateway 102 and/or acquirer system 108. In some non-limiting embodiments or aspects, acquirer system 108, associated with merchant system 104, may operate as payment gateway 102 to facilitate the communication of transaction requests from merchant system 104 to transaction processing system 101. Merchant system 104 may communicate with payment gateway 102 through a public or private network connection. For example, merchant system 104, that includes a physical POS device, may communicate with payment gateway 102 through a public or private network to conduct card-present transactions. As another example, merchant system 104, that includes a server (e.g., a web server), may communicate with payment gateway 102 through a public or private network, such as a public Internet connection, to conduct card-not-present transactions.

In some non-limiting embodiments or aspects, transaction processing system 101, after receiving a transaction request from merchant system 104 that identifies an account identifier of a payor (e.g., such as an account holder) associated with consumer device 110, may generate an authorization request message to be communicated to issuer system 106 that issued consumer device 110 and/or account identifier. Issuer system 106 may then approve or decline the authorization request and, based on the approval or denial, generate an authorization response message that is communicated to transaction processing system 101. Transaction processing system 101 may communicate an approval or denial to merchant system 104. When issuer system 106 approves the authorization request message, it may then clear and settle the payment transaction between issuer system 106 and acquirer system 108.

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of electronic payment processing network 100 may perform one or more functions described as being performed by another set of systems or another set of devices of electronic payment processing network 100.

Figure 2:
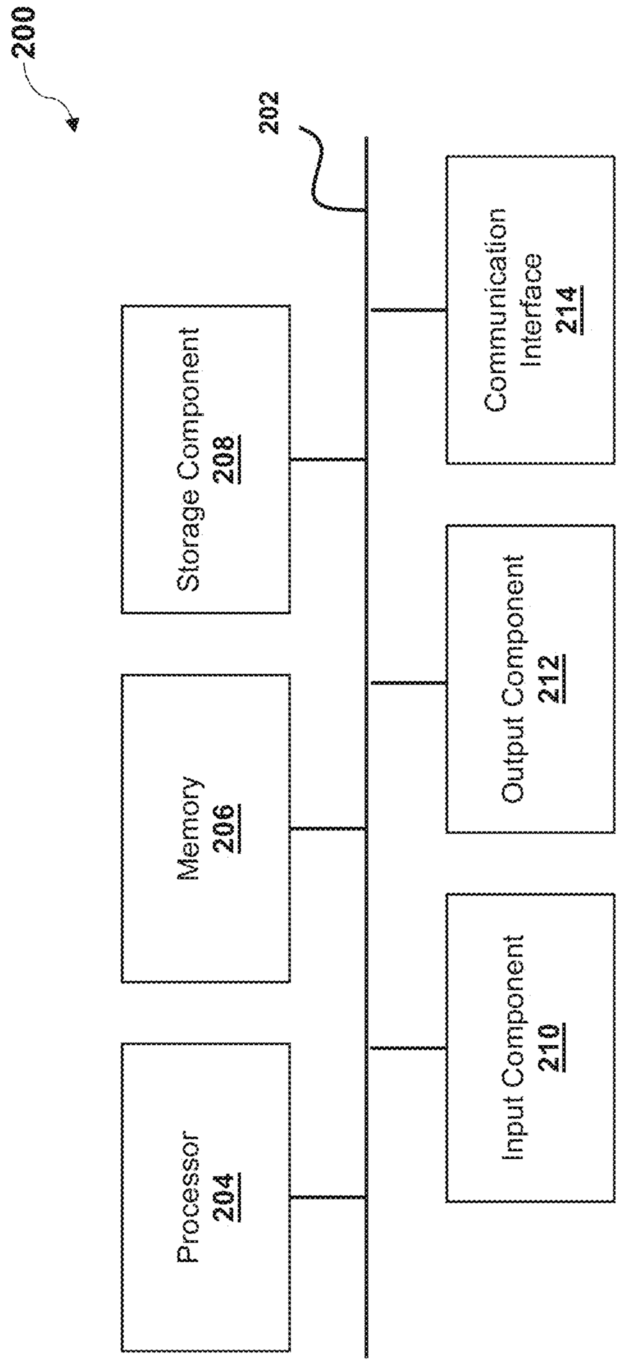
FIG. 2 is a schematic diagram of example components of one or more devices of FIG. 1, according to some non-limiting embodiments or aspects.

Referring now to FIG. 2, shown is a diagram of example components of a device 200, according to some non-limiting embodiments or aspects. Device 200 may correspond to transaction processing system 101, payment gateway 102, merchant system 104, issuer system 106, acquirer system 108, and/or consumer device 110, as an example. In some non-limiting embodiments or aspects, such systems or devices may include at least one device 200 and/or at least one component of device 200. The number and arrangement of components shown are provided as an example. In some non-limiting embodiments or aspects, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include bus 202, processor 204, memory 206, storage component 208, an input component 210, an output component 212, and a communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

Figure 3A:
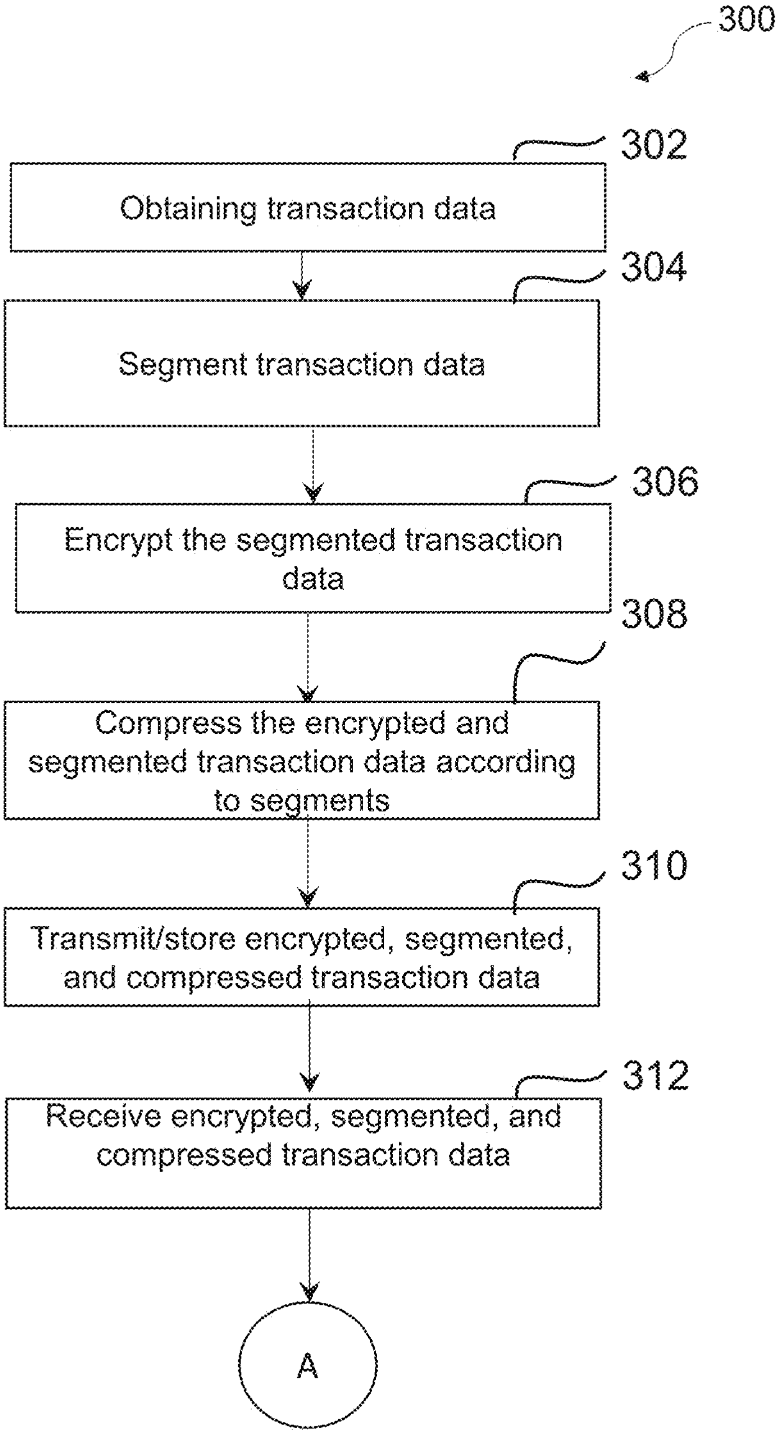
FIGS. 3A and 3B are flow diagrams of a method for transaction data compression, according to some non-limiting embodiments or aspects.
Figure 3B:
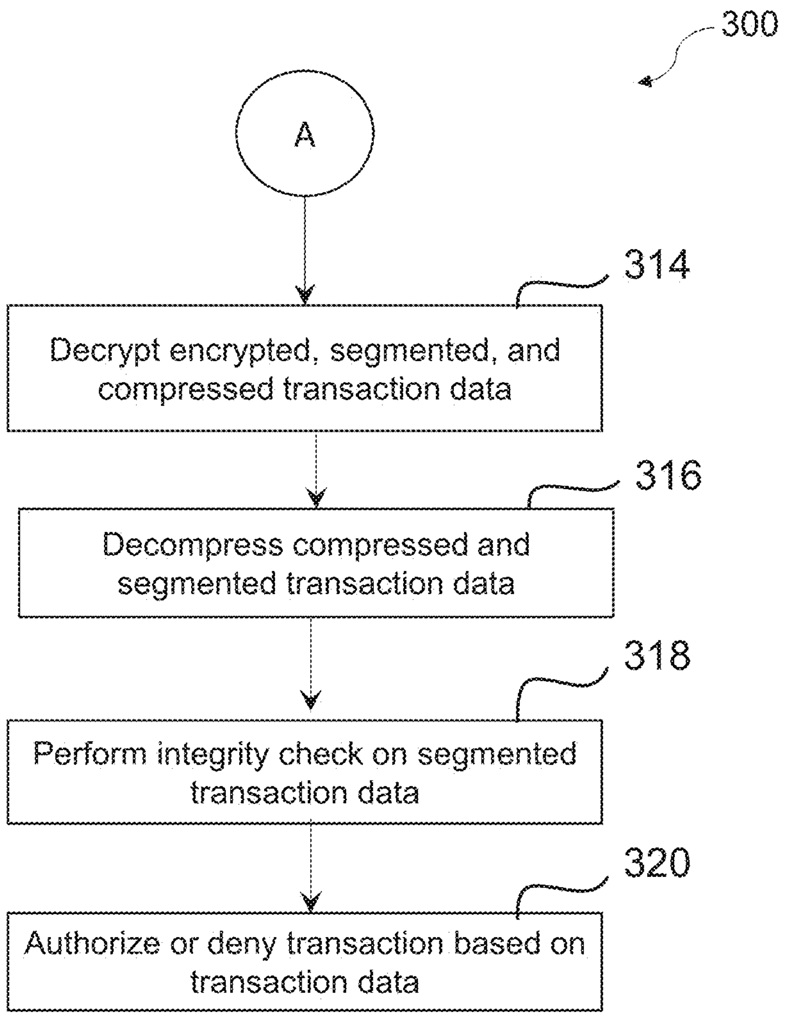

Referring now to FIGS. 3A and 3B, shown are flow diagrams for a method 300 for transaction data compression, according to some non-limiting embodiments or aspects. The steps shown in FIGS. 3A and 3B are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step.

As shown in FIG. 3A, at step 302, method 300 includes obtaining transaction data associated with a transaction. For example, transaction processing system 101 and/or merchant system 104 (e.g., a POS device of merchant system 104, etc.) may obtain transaction data associated with a transaction. As an example, a first transaction processing server of transaction processing system 101 may obtain the transaction data from itself, payment gateway 102, merchant system 104 (e.g., a POS device of merchant system 104, etc.), issuer system 106, acquirer system 108, consumer device 110, and/or a second transaction processing server of transaction processing system 101 different than the first transaction processing server. As an example, merchant system 104 may receive the transaction data from itself, payment gateway 102, merchant system 104 (e.g., a POS device of merchant system 104, etc.), issuer system 106, acquirer system 108, consumer device 110, and/or transaction processing system 101.

Figure 4:
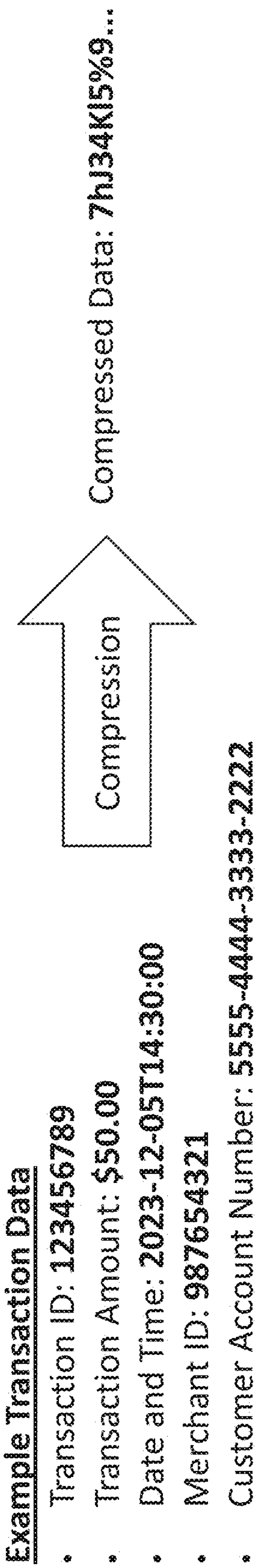
FIG. 4 illustrates compression of transaction data associated with an example transaction, according to some non-limiting embodiments or aspects.

Transaction data may include parameters associated with a transaction, such as an account identifier (e.g., a PAN, etc.), a transaction identifier, a transaction amount, a transaction date and time (e.g., a timestamp, etc.), a type of product and/or service associated with the transaction, a conversion rate of currency, a type of currency, a merchant type, a merchant name, a merchant identifier, a merchant location, a transaction approval (and/or decline) rate, numerical data, sensitive data, string data, temporal data, and/or the like. For example, and referring also to FIG. 4, which illustrates compression of transaction data associated with an example transaction, according to some non-limiting embodiments or aspects, transaction data associated with an example transaction may include the following: Transaction ID: 123456789; Transaction Amount: $50.00; Date and Time: 2023-12-05T14:30:00; Merchant ID: 987654321; and Customer Account Number: 5555-4444-3333-2222.

As shown in FIG. 3A, at step 304, method 300 includes segmenting the transaction data into numerical data, sensitive data, string data, and/or temporal data. For example, transaction processing system 101 and/or merchant system 104 (e.g., a POS device of merchant system 104, etc.) may segment the transaction data into numerical data, sensitive data, string data, and/or temporal data. As an example, transaction processing system 101 and/or merchant system 104 (e.g., a POS device of merchant system 104, etc.) may segment the transaction data into numerical data, sensitive data, string data, and/or temporal data based on contents of the transaction data, such as a type (e.g., numeric, alphanumeric, textual, etc.), a format (e.g., a date-time or timestamp format, an address format, etc.), a length, a volume, and/or the like of portions of the transaction data.

Numerical data my include data that includes numerals, such as a transaction identifier, a transaction amount, a merchant identifier, and/or the like. Numerical data may include long numerical data and short numerical data. Long numerical data may include numerical data, including a number of digits that satisfies a threshold number of digits. For example, long numerical data may include an account identifier, a transaction identifier, a merchant identifier, and/or the like. Short numerical data may include numerical data, including a number of digits that does not satisfy the threshold number of digits. For example, short numerical data may include a transaction amount, which may be within a known range (e.g., $0.01 to $10,000.00, etc.), and/or the like. Sensitive data may include data that includes Personally Identifiable Information (PII), an account identifier (e.g., a PAN, etc.), and/or the like. String data may include textual data (e.g., text, alphanumeric characters, etc.), a merchant name, a merchant identifier, a merchant location, a timestamp, and/or the like. Temporal data may include a transaction date and time (e.g., a timestamp, etc.).

In some non-limiting embodiments or aspects, transaction processing system 101 and/or merchant system 104 (e.g., a POS device of merchant system 104, etc.) may segment the transaction data into numerical data, sensitive data, string data, and temporal data by: further segmenting the numerical data into long numerical data and short numerical data.

In some non-limiting embodiments or aspects, transaction processing system 101 and/or merchant system 104 (e.g., a POS device of merchant system 104, etc.) may segment the transaction data into numerical data (e.g., long numerical data, short numerical data, etc.), sensitive data, string data, and/or temporal data by providing the transaction data to a machine-learning model (e.g., a neural network, a segmentation model, a classifier model, etc.) trained to segment the transaction data into numerical data (e.g., long numerical data, short numerical data, etc.), sensitive data, string data, and/or temporal data. For example, transaction processing system 101 and/or merchant system 104 (e.g., a POS device of merchant system 104, etc.) may segment the transaction data into numerical data (e.g., long numerical data, short numerical data, etc.), sensitive data, string data, and/or temporal data by providing the transaction data as input to the machine learning model trained to segment the transaction data and receiving as output from the machine learning model the numerical data (e.g., the long numerical data, the short numerical data, etc.), the sensitive data, the string data, and/or the temporal data. In this way, some non-limiting embodiments or aspects of the present disclosure may use machine learning techniques to analyze incoming transaction data streams and apply more effective compression methods to the different types of transaction data based on data characteristics.

As shown in FIG. 3A, at step 306, method 300 includes encrypting the segmented transaction data. For example, transaction processing system 101 and/or merchant system 104 (e.g., a POS device of merchant system 104, etc.) may encrypt the segmented transaction data. As an example, transaction processing system 101 and/or merchant system 104 (e.g., a POS device of merchant system 104, etc.) may encrypt (e.g., using an advanced encryption standard (AES), etc.) at least one of the following: the numerical data (e.g., long numerical data, short numerical data, etc.), the sensitive data, the string data, the temporal data, or any combination thereof, before that data is compressed in step 308 of method 300. For example, transaction processing system 101 and/or merchant system 104 (e.g., a POS device of merchant system 104, etc.) may encrypt the sensitive data (e.g., using AES 256, etc.) to ensure security before the sensitive data is compressed using the at least one second compression algorithm.

As shown in FIG. 3A, at step 308, method 300 includes compressing the encrypted and segmented transaction data according to the segments. For example, transaction processing system 101 and/or merchant system 104 (e.g., a POS device of merchant system 104, etc.) may compress the encrypted and segmented transaction data according to the segments. As an example, transaction processing system 101 and/or merchant system 104 (e.g., a POS device of merchant system 104, etc.) may compress, using at least one first compression algorithm, the numerical data into compressed numerical data; compress, using at least one second compression algorithm different than the at least one first compression algorithm, the sensitive data into compressed sensitive data; compress, using at least one third compression algorithm different than the at least one first compression algorithm and the at least one second compression algorithm, the string data into compressed string data; and/or compress, using at least one fourth compression algorithm different than the at least one first compression algorithm, the at least one second compression algorithm, and the at least one third compression algorithm, the temporal data into compressed temporal data. In this way, transaction processing system 101 and/or merchant system 104 (e.g., a POS device of merchant system 104, etc.) may dynamically adjust the compression ratio based on the data type (e.g., numerical transaction data, textual customer information, etc.).

The at least one first compression algorithm may include a first lossless compression algorithm (e.g., a modified Huffman coding, etc.). The at least one second compression algorithm may include a second lossless compression algorithm (e.g., a LZ77 algorithm, etc.) different than the first lossless compression algorithm. The at least one third compression algorithm may include a lossy compression algorithm (e.g., a Dropped Vowels (DOV) algorithm, Letter Mapping (LMP) algorithm, and a Replacement of Characters (ROC) algorithm, etc.). The at least one fourth compression algorithm may include a pattern recognition algorithm (e.g., string matching algorithm, etc.). In this way, some non-limiting embodiments or aspects may combine both lossless and lossy compression techniques, such as using lossless compression for more critical transaction data (e.g., an account identifier, etc.) and controlled lossy compression for less critical, bulky data (e.g., lengthy text fields, etc.).

In some non-limiting embodiments or aspects, transaction processing system 101 and/or merchant system 104 (e.g., a POS device of merchant system 104, etc.) may compress, using the at least one first compression algorithm, the numerical data into compressed numerical data by: converting the long numerical data from a first numeral base to a second numeral base having a higher base than the first numeral base; and/or mapping the short numerical data from a first numeric range to a second numeric range having a smaller set of numbers than the first numeric range. For example, transaction processing system 101 and/or merchant system 104 (e.g., a POS device of merchant system 104, etc.) may perform base conversion on the long numerical data. As an example, long numerals may be converted from base-10 (decimal) to a higher base (e.g., base-36, etc.), which uses a larger set of characters (0-9, A-Z) to represent the same value in fewer digits. For example, an example customer account number 4455-6677-8899-0011 may be converted from base-10 (decimal) to a higher base, base-36, that uses a larger set of characters (0-9, A-Z) for a more compact representation. In such an example, a converted value may be "HGF5-987Z-ABCL-0D1".

Transaction processing system 101 and/or merchant system 104 (e.g., a POS device of merchant system 104, etc.) may perform range mapping on the short numerical data. As an example, by knowing a typical range of transaction amounts (e.g., $0.01 to $10,000, etc.), the transaction amount may be mapped to a smaller set of numbers (e.g., $4.50 may be compressed to 450, etc.), which reduces the number of bits needed to store the amount.

Transaction processing system 101 and/or merchant system 104 (e.g., a POS device of merchant system 104, etc.) may apply a basic dictionary or look-up table to the short numerical data. As an example, if specific merchants names and/or identifiers (e.g., "ABC Coffee", etc.) appear in transaction data frequently enough to satisfy a threshold value, a dictionary or look-up table may be created in which the merchant names and/or identifiers are assigned shorter codes (e.g., "CF1" for "ABC Coffee", etc.) to represent the merchant's names and/or identifiers, which reduces redundancy in frequently used data.

Transaction processing system 101 and/or merchant system 104 (e.g., a POS device of merchant system 104, etc.) may apply timestamp compression to string data and/or temporal data. As an example, timestamps may undergo a dedicated compression suited for date and time formats, which may include removing separators or using a specific coding scheme for dates and times.

For example, using the following example transaction data: Customer Account Number: 4455-6677-8899-0011; Transaction ID: 123456; Short Numeral: Purchase Amount: $4.50; Strings: Merchant ID: "ABC Coffee"; and Timestamp: 2024-03-16T08:15:00, a final compressed version of this transaction data may resemble the following: HGF5-987Z-ABCL-0D1: TRID:XYZ AMT:450 DT:*(compressed timestamp) MID:CF1, where "HGF5-987Z-ABCL-0D1" is the base-36 representation of the customer account number; "TRID:XYZ" is a placeholder indicating the location for the compressed transaction ID (which may be base-36 encoded as well); "AMT:450" is the compressed purchase amount using range mapping; "DT:*(compressed timestamp)" is a placeholder for the compressed timestamp; and "MID:CF1" is the code from the dictionary or look-up representing "ABC Coffee". In this way, some non-limiting embodiments or aspects may employ a mix of techniques: base conversion, delta encoding, range mapping, and/or dictionary-based compression, to ensure a more tailored technique is used for each of the different data types and/or may analyze historical data to anticipate common transaction patterns, pre-creating compressed templates and partially pre-compressing elements for accelerated real-time processing.

In some non-limiting embodiments or aspects, transaction processing system 101 and/or merchant system 104 (e.g., a POS device of merchant system 104, etc.) may compress, using the at least one first compression algorithm, the numerical data into compressed numerical data using delta encoding. For example, if transaction data for consecutive transactions from a same customer is obtained, transaction processing system 101 and/or merchant system 104 (e.g., a POS device of merchant system 104, etc.) may store only a difference between the current transaction identifier and the previous transaction identifier, if the difference is a small increment (e.g., +1 for sequential transaction identifiers, etc.).

In some non-limiting embodiments or aspects, transaction processing system 101 and/or merchant system 104 (e.g., a POS device of merchant system 104, etc.) may compress, using the at least one third compression algorithm different than the at least one first compression algorithm and the at least one second compression algorithm, the string data into compressed string data by: identifying, in the string data, a merchant identifier associated with a merchant associated with the transaction; and/or replacing, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

In some non-limiting embodiments or aspects, transaction processing system 101 and/or merchant system 104 (e.g., a POS device of merchant system 104, etc.) may compress in parallel at least two, three, or each of the following: (i) the numerical data into compressed numerical data using the at least one first compression algorithm (e.g., each of the long numerical data and the short numerical data, etc.), (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm. For example, transaction processing system 101 and/or merchant system 104 (e.g., a POS device of merchant system 104, etc.) may compress each type of segment data in parallel to speed up the compression process, which may improve real-time processing capabilities of electronic payment processing network 100. As an example, transaction processing system 101 and/or merchant system 104 (e.g., a POS device of merchant system 104, etc.) may use multi-threading (e.g., multi-core processors, etc.) and/or distributed computing (e.g., a Hadoop system, etc.) to concurrently compress and/or decompress the segmented transaction data.

As shown in FIG. 3A, at step 310, method 300 includes at least one of the following: (i) storing, in a data store, the encrypted, segmented, and compressed transaction data; and (ii) transmitting the encrypted, segmented, and compressed transaction data to a transaction processing server, or any combination thereof. For example, transaction processing system 101 and/or merchant system 104 (e.g., a POS device of merchant system 104, etc.) may at least one of the following: (i) store, in a data store, the encrypted, segmented, and compressed transaction data; and (ii) transmit the encrypted, segmented, and compressed transaction data to a transaction processing server, or any combination thereof. As an example, a first transaction processing server of transaction processing system 101 may at least one of the following: (i) store, in a data store (e.g., in a database, in a memory, in the first transaction processing server, in a Hadoop-based system, etc.), the compressed numerical data, the compressed sensitive data, the compressed string data, and/or the compressed temporal data; and (ii) transmit the compressed numerical data, the compressed sensitive data, the compressed string data, and/or the compressed temporal data to a second transaction processing server of transaction processing system 101, or any combination thereof. As an example, merchant system 104 (e.g., a POS device of merchant system 104, etc.) may at least one of the following: (i) store, in a data store (e.g., in a database, in a memory, in the POS device, in a Hadoop-based system, etc.), the compressed numerical data, the compressed sensitive data, the compressed string data, and/or the compressed temporal data; and (ii) transmit the compressed numerical data, the compressed sensitive data, the compressed string data, and/or the compressed temporal data to a transaction processing server of transaction processing system 101, or any combination thereof.

As shown in FIG. 3A, at step 312, method 300 includes receiving the encrypted, segmented, and compressed transaction data. For example, transaction processing system 101 may receive the encrypted, segmented, and compressed transaction data. As an example, a first transaction processing server of transaction processing system 101 may at receive the compressed numerical data, the compressed sensitive data, the compressed string data, and/or the compressed temporal data from merchant system 104 (e.g., a POS device of merchant system 104, etc.) and/or a second transaction processing server of transaction processing system 101. For example, and referring again to FIG. 4, the transaction data associated with the example transaction therein may be transmitted and received as Compressed Data: 7hJ34KI5%9 . . . , which is a much shorter, compressed string representing the original transaction data.

As shown in FIG. 3B, at step 314, method 300 includes decrypting the encrypted, segmented, and compressed transaction data. For example, transaction processing system 101 may decrypt (e.g., using the AES, etc.) the encrypted, segmented, and compressed transaction data. As an example, transaction processing system 101 may decrypt the encrypted, segmented, and compressed numerical data, the encrypted, segmented, and compressed sensitive data, the encrypted, segmented, and compressed string data, and/or the encrypted, segmented, and compressed temporal data. In such an example, transaction processing system 101 may use a decryption algorithm corresponding to the encryption algorithm used to encrypt the data.

As shown in FIG. 3B, at step 316, method 300 includes decompressing the compressed and segmented transaction data according to the segments. For example, transaction processing system 101 may decompress the compressed and segmented transaction data according to the segments. As an example, transaction processing system 101 may decompress, using at least one first decompression algorithm corresponding to the at least one first compression algorithm, the compressed numerical data into the numerical data; decompress, using at least one second decompression algorithm corresponding to the at least one second compression algorithm, the compressed sensitive data into the sensitive data; decompress, using at least one third decompression algorithm corresponding to the least one third compression algorithm, the compressed string data into the string data; decompress, using at least one fourth decompression algorithm corresponding to the at least one fourth compression algorithm, the compressed temporal data into the temporal data. For example, transaction processing system 101 may recognize the data types in the compressed data based on contents of the compressed data, such as a type, a format, a length, a volume, and/or the like of portions of the compressed data and apply the corresponding decompression algorithm or technique. In some non-limiting embodiments or aspects, transaction processing system 101 may use one or more look-ahead techniques and/or caching to speed up the decompression of the compressed and segmented transaction data according to the segments.

As shown in FIG. 3B, at step 318, method 300 includes performing an integrity check on the segmented transaction data. For example, transaction processing system 101 may perform an integrity check on the segmented transaction data. As an example, transaction processing system 101 may verify data integrity of the segmented transaction data post-decompression using checksums or hash function to ensure data integrity during the compression and decompression processes, thereby ensuring that the transaction data is accurate and has not been corrupted transmission.

As shown in FIG. 3B, at step 320, method 300 includes authorizing or denying, based on the transaction data, the transaction. For example, transaction processing system 101 may authorize or deny, based on the transaction data, the transaction. As an example, transaction processing system 101 may authorize or deny, based on at least one of the following: the numerical data, the sensitive data, the string data, the temporal data, or any combination thereof, the transaction (e.g., authorize or deny the transaction in electronic payment processing network 100, etc.).

In some non-limiting embodiments or aspects, method 300 may adhere to or comply with the Payment Card Industry Data Security Standard (PCI DSS) and/or other relevant financial data security standards. Further, some non-limiting embodiments or aspects of method 300 may be continually or periodically benchmarked against standard compression tools to ensure performance, and/or method 300 may be continually or continuously improved or optimized based on updated transaction data (e.g., based on real-world performance data, etc.).

Accordingly, non-limiting embodiments or aspects of the present disclosure may provide efficient, fast, and secure compression for high-volume, high-velocity transactional data, suitable for the real-time processing needs of transaction processing systems.

Aspects described include artificial intelligence or other operations whereby the system processes inputs and generates outputs with apparent intelligence. The artificial intelligence may be implemented in whole or in part by a model. A model may be implemented as a machine learning model. The learning may be supervised, unsupervised, reinforced, or a hybrid learning, whereby multiple learning techniques are employed to generate the model. The learning may be performed as part of training. Training the model may include obtaining a set of training data and adjusting characteristics of the model to obtain a desired model output. For example, three characteristics may be associated with a desired item location. In such instance, the training may include receiving the three characteristics as inputs to the model and adjusting the characteristics of the model, such that for each set of three characteristics, the output device state matches the desired device state associated with the historical data.

In some implementations, the training may be dynamic. For example, the system may update the model using a set of events. The detectable properties from the events may be used to adjust the model.

The model may be an equation, artificial neural network, recurrent neural network, convolutional neural network, decision tree, or other machine-readable artificial intelligence structure. The characteristics of the structure available for adjusting during training may vary based on the model selected. For example, if a neural network is the selected model, characteristics may include input elements, network layers, node density, node activation thresholds, weights between nodes, input or output value weights, or the like. If the model is implemented as an equation (e.g., regression), the characteristics may include weights for the input parameters, thresholds, or limits for evaluating an output value, or criterion for selecting from a set of equations.

Once a model is trained, retraining may be included to refine or update the model to reflect additional data or specific operational conditions. The retraining may be based on one or more signals detected by a device described herein or as part of a method described herein. Upon detection of the designated signals, the system may activate a training process to adjust the model as described.

Further examples of machine learning and modeling features, which may be included in the embodiments discussed above, are described in "A survey of machine learning for big data processing" by Qiu et al. in EURASIP Journal on Advances in Signal Processing (2016) which is hereby incorporated by reference in its entirety.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A system, comprising:

at least one processor configured to:

obtain transaction data associated with a transaction, the transaction data including at least a transaction identifier, a transaction amount, a transaction timestamp, a merchant identifier, and a customer account number;

segment, based on contents of the transaction identifier, the transaction amount, the transaction timestamp, the merchant identifier, and the customer account number of the transaction data, the transaction amount, the transaction timestamp, the merchant identifier, and the customer account number of the transaction data into numerical data, sensitive data, string data, and temporal data;

compress, using at least one first compression algorithm, the numerical data into compressed numerical data;

compress, using at least one second compression algorithm different than the at least one first compression algorithm, the sensitive data into compressed sensitive data;

compress, using at least one third compression algorithm different than the at least one first compression algorithm and the at least one second compression algorithm, the string data into compressed string data;

compress, using at least one fourth compression algorithm different than the at least one first compression algorithm, the at least one second compression algorithm, and the at least one third compression algorithm, the temporal data into compressed temporal data; and at least one of the following: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

2. The system of claim 1, wherein the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

3. The system of claim 1, wherein the at least one processor is configured to segment the transaction data into the numerical data, the sensitive data, the string data, and the temporal data by:

further segmenting the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein the at least one processor is configured to compress, using the at least one first compression algorithm, the numerical data into compressed numerical data by:

converting the long numerical data from a first numeral base to a second numeral base having a higher base than the first numeral base; and mapping the short numerical data from a first numeric range to a second numeric range having a smaller set of numbers than the first numeric range.

4. The system of claim 1, wherein the at least one processor is configured to compress, using the at least one third compression algorithm different than the at least one first compression algorithm and the at least one second compression algorithm, the string data into compressed string data by:

identifying, in the string data, the merchant identifier; and replacing, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

5. The system of claim 1, wherein the at least one processor is configured to compress in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

6. The system of claim 1, further comprising:

a point-of-sale (POS) device including the at least one processor, wherein the at least one processor of the POS device is configured to transmit the compressed numerical data, the compressed sensitive data, the compressed string data, and the compressed temporal data to the transaction processing server; and the transaction processing server including at least one processor configured to:

receive the compressed numerical data, the compressed sensitive data, the compressed string data, and the compressed temporal data;

decompress, using at least one first decompression algorithm corresponding to the at least one first compression algorithm, the compressed numerical data into the numerical data;

decompress, using at least one second decompression algorithm corresponding to the at least one second compression algorithm, the compressed sensitive data into the sensitive data;

decompress, using at least one third decompression algorithm corresponding to the least one third compression algorithm, the compressed string data into the string data;

decompress, using at least fourth decompression algorithm corresponding to the at least one fourth compression algorithm, the compressed temporal data into the temporal data; and authorize or deny, based on at least one of the following: the numerical data, the sensitive data, the string data, the temporal data, or any combination thereof, the transaction.

7. The system of claim 1, wherein the at least one processor is further configured to:

encrypt the sensitive data before the sensitive data is compressed using the at least one second compression algorithm.

8. A method, comprising:

obtaining, with at least one processor, transaction data associated with a transaction, the transaction data including at least a transaction identifier, a transaction amount, a transaction timestamp, a merchant identifier, and a customer account number;

segmenting, with the at least one processor, based on contents of the transaction identifier, the transaction amount, the transaction timestamp, the merchant identifier, and the customer account number of the transaction data, the transaction amount, the transaction timestamp, the merchant identifier, and the customer account number of the transaction data into numerical data, sensitive data, string data, and temporal data;

compressing, with the at least one processor, using at least one first compression algorithm, the numerical data into compressed numerical data;

compressing, with the at least one processor, using at least one second compression algorithm different than the at least one first compression algorithm, the sensitive data into compressed sensitive data;

compressing, with the at least one processor, using at least one third compression algorithm different than the at least one first compression algorithm and the at least one second compression algorithm, the string data into compressed string data;

compressing, with the at least one processor, using at least one fourth compression algorithm different than the at least one first compression algorithm, the at least one second compression algorithm, and the at least one third compression algorithm, the temporal data into compressed temporal data; and at least one of the following: (i) storing, with the at least one processor, in a data store, the compressed numerical data, the compressed sensitive data, the compressed string data, and the compressed temporal data; and (ii) transmitting, with the at least one processor, the compressed numerical data, the compressed sensitive data, the compressed string data, and the compressed temporal data to a transaction processing server, or any combination thereof.

9. The method of claim 8, wherein the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

10. The method of claim 8, wherein segmenting, with the at least one processor, the transaction data into the numerical data, the sensitive data, the string data, and the temporal data includes:

further segmenting, with the at least one processor, the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein compressing, with the at least one processor, using the at least one first compression algorithm, the numerical data into compressed numerical data includes:

converting, with the at least one processor, the long numerical data from a first numeral base to a second numeral base having a higher base than the first numeral base; and mapping, with the at least one processor, the short numerical data from a first numeric range to a second numeric range having a smaller set of numbers than the first numeric range.

11. The method of claim 8, wherein compressing, with the at least one processor, using the at least one third compression algorithm different than the at least one first compression algorithm and the at least one second compression algorithm, the string data into compressed string data includes:

identifying, with the at least one processor, in the string data, the merchant identifier; and replacing, with the at least one processor, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

12. The method of claim 8, wherein the at least one processor compresses in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

13. The method of claim 8, further comprising:

receiving, with the at least one processor, the compressed numerical data, the compressed sensitive data, the compressed string data, and the compressed temporal data;

decompressing, with the at least one processor, using at least one first decompression algorithm corresponding to the at least one first compression algorithm, the compressed numerical data into the numerical data;

decompressing, with the at least one processor, using at least one second decompression algorithm corresponding to the at least one second compression algorithm, the compressed sensitive data into the sensitive data;

decompressing, with the at least one processor, using at least one third decompression algorithm corresponding to the least one third compression algorithm, the compressed string data into the string data;

decompressing, with the at least one processor, using at least fourth decompression algorithm corresponding to the at least one fourth compression algorithm, the compressed temporal data into the temporal data; and authorizing or denying, with the at least one processor, based on at least one of the following: the numerical data, the sensitive data, the string data, the temporal data, or any combination thereof, the transaction.

14. The method of claim 8, further comprising:

encrypting, with the at least one processor, the sensitive data before the sensitive data is compressed using the at least one second compression algorithm.

15. A computer program product comprising at least one non-transitory computer-readable medium including program instructions that, when executed by at least one processor, cause the at least one processor to:

obtain transaction data associated with a transaction, the transaction data including at least a transaction identifier, a transaction amount, a transaction timestamp, a merchant identifier, and a customer account number;

segment, based on contents of the transaction identifier, the transaction amount, the transaction timestamp, the merchant identifier, and the customer account number of the transaction data, the transaction amount, the transaction timestamp, the merchant identifier, and the customer account number of the transaction data into numerical data, sensitive data, string data, and temporal data;

compress, using at least one first compression algorithm, the numerical data into compressed numerical data;

compress, using at least one second compression algorithm different than the at least one first compression algorithm, the sensitive data into compressed sensitive data;

compress, using at least one third compression algorithm different than the at least one first compression algorithm and the at least one second compression algorithm, the string data into compressed string data;

compress, using at least one fourth compression algorithm different than the at least one first compression algorithm, the at least one second compression algorithm, and the at least one third compression algorithm, the temporal data into compressed temporal data; and at least one of the following: (i) store, in a data store, the compressed numerical data, the compressed sensitive data, the compressed string data, and the compressed temporal data; and (ii) transmit the compressed numerical data, the compressed sensitive data, the compressed string data, and the compressed temporal data to a transaction processing server, or any combination thereof.

16. The computer program product of claim 15, wherein the at least one first compression algorithm includes a first lossless compression algorithm, wherein the at least one second compression algorithm includes a second lossless compression algorithm different than the first lossless compression algorithm, wherein the at least one third compression algorithm includes a lossy compression algorithm, and wherein the at least one fourth compression algorithm includes a pattern recognition algorithm.

17. The computer program product of claim 15, wherein the program instructions, when executed by the at least one processor, cause the at least one processor to segment the transaction data into the numerical data, the sensitive data, the string data, and the temporal data by:

further segmenting the numerical data into long numerical data and short numerical data, wherein the long numerical data includes numerical data including a number of digits that satisfies a threshold number of digits, and wherein the short numerical data includes numerical data including a number of digits that does not satisfy the threshold number of digits, and wherein the at least one processor is configured to compress, using the at least one first compression algorithm, the numerical data into compressed numerical data by:

converting the long numerical data from a first numeral base to a second numeral base having a higher base than the first numeral base; and mapping the short numerical data from a first numeric range to a second numeric range having a smaller set of numbers than the first numeric range.

18. The computer program product of claim 15, wherein the program instructions, when executed by the at least one processor, cause the at least one processor to compress, using the at least one third compression algorithm different than the at least one first compression algorithm and the at least one second compression algorithm, the string data into compressed string data by:

identifying, in the string data, the merchant identifier; and replacing, by accessing a look-up table including a plurality of merchant identifiers mapped to a plurality of merchant codes, the merchant identifier in the string data with a merchant code of the plurality of merchant codes associated with the merchant identifier in the look-up table, wherein the merchant code includes a fewer number of digits than the merchant identifier.

19. The computer program product of claim 15, wherein the program instructions, when executed by the at least one processor, cause the at least one processor to compress in parallel at least two of the following: (i) the numerical data into compressed numerical data using the at least one first compression algorithm, (ii) the sensitive data into compressed sensitive data using the at least one second compression algorithm different than the at least one first compression algorithm, (iii) the string data into compressed string data using the at least one third compression algorithm different than the at least one first compression algorithm and the at least one second compression algorithm, and (iv) the temporal data into compressed temporal data using the at least one fourth compression algorithm different than the at least one first compression algorithm, the at least one second compression algorithm, and the at least one third compression algorithm.

20. The computer program product of claim 15, wherein the program instructions, when executed by the at least one processor, further cause the at least one processor to:

receive the compressed numerical data, the compressed sensitive data, the compressed string data, and the compressed temporal data;

decompress, using at least one first decompression algorithm corresponding to the at least one first compression algorithm, the compressed numerical data into the numerical data;

decompress, using at least one second decompression algorithm corresponding to the at least one second compression algorithm, the compressed sensitive data into the sensitive data;

decompress, using at least one third decompression algorithm corresponding to the least one third compression algorithm, the compressed string data into the string data;

decompress, using at least fourth decompression algorithm corresponding to the at least one fourth compression algorithm, the compressed temporal data into the temporal data; and authorize or deny, based on at least one of the following: the numerical data, the sensitive data, the string data, the temporal data, or any combination thereof, the transaction.

* * * * *